United States Patent

Pride

[11] Patent Number: 6,116,082
[45] Date of Patent: Sep. 12, 2000

[54] METHOD AND APPARATUS FOR TESTING A FLUID CONDUIT SYSTEM FOR LEAKS

[75] Inventor: Russell Desmond Pride, Leics, United Kingdom

[73] Assignee: BG plc, Reading, United Kingdom

[21] Appl. No.: 09/051,473

[22] PCT Filed: Oct. 17, 1996

[86] PCT No.: PCT/GB96/02571

§ 371 Date: May 12, 1998

§ 102(e) Date: May 12, 1998

[87] PCT Pub. No.: WO97/14944

PCT Pub. Date: Apr. 24, 1997

[30] Foreign Application Priority Data

Oct. 19, 1995 [GB] United Kingdom .................... 9521437

[51] Int. Cl.$^7$ ................................................. G01M 3/08
[52] U.S. Cl. ............................................ 73/40.5 R; 73/40
[58] Field of Search ........................... 73/40.5 R, 49.2 T, 73/49.2 R, 40

[56] References Cited

U.S. PATENT DOCUMENTS

| | | |
|---|---|---|
| 3,943,752 | 3/1976 | Doerman et al. . |
| 4,715,214 | 12/1987 | Tveter et al. ............................ 73/49.2 |
| 5,361,622 | 11/1994 | Wall . |
| 5,866,802 | 2/1999 | Kimata et al. ........................ 73/40.5 R |

FOREIGN PATENT DOCUMENTS

| | | |
|---|---|---|
| 0 133 148 | 2/1985 | European Pat. Off. . |
| 39 05 054 | 4/1990 | Germany . |

*Primary Examiner*—Michael Brock
*Attorney, Agent, or Firm*—Oblon, Spivak, McClelland, Maier & Neustadt, P.C.

[57] ABSTRACT

A method and apparatus for testing a fluid conduit system for leaks. The apparatus is connected to an isolated section of a domestic fuel gas system which is suspected of leaking. The apparatus determines over recorded time periods the pressure drop in the system as a result of the actual gas leak and subsequently the pressure drop in the system as a result of an actual leak plus the leakage through an introduced artificial and calibrated orifice provided by the apparatus. The data is used in an equation for calculating the actual leakage rate from the system. This method avoids the need to repressurize the system between pressure drop measurements or having to know or assume the volume of the system being tested.

19 Claims, 10 Drawing Sheets

METHOD AND APPARATUS FOR TESTING A FLUID CONDUIT SYSTEM FOR LEAKS

BACKGROUND OF THE INVENTION

1. Field of the Invention

This invention relates to a method and apparatus for testing a fluid conduit system, such as a domestic fuel gas supply system or installation, for gas leaks and, more particularly, for monitoring and determining the volumetric leakage rate of gas from such a system or installation.

2. Discussion of the Background

The portion of the domestic system with which the applicants are primarily concerned comprises: the pipework between the gas meter and the main stop cock or valve (normally at or fairly close to the upstream, inlet side of the gas meter); the gas meter itself; and the pipework between the outlet of the meter and the gas control valve(s) on the downstream appliance(s). One presently used method for testing such systems for leaks where there is a suspected leak involves isolating the system by closing the stop valve and the or each gas control valve, pressurising the system by opening the stop valve, closing the stop valve, and from a predetermined pressure in the system measuring the pressure drop in the isolated system over a set length of time. If a predetermined maximum acceptable pressure drop is not exceeded then the system is considered to be sound.

The above described present method assumes that all such system portions have approximately the same volume. In the past this was a reasonably valid assumption to make since the volume of the gas meter has by far contributed the major part of the total volume of the isolated system and in the UK a standard domestic gas meter has been employed for many years. Consequently, the volume differences in the pipework in different systems could be ignored. However, with the introduction of new, relatively low volume gas meters it will no longer be appropriate to ignore the differences in the pipework volume from system to system or the differences between different low volume gas meters and thus the assumption previously made will no longer be a valid one.

A method of testing an industrial gas system or installation to determine the volumetric leakage rate without having to ascertain or assume volume of the system being tested is known already. The method involves isolating the system, pressurising the system to a predetermined pressure, measuring the pressure drop ($\Delta P_1$) in the system from that predetermined pressure over a fixed time period ($T_1$), repressurising the system to the same starting or predetermined pressure and introducing a calibrated orifice, i.e. a known 'artificial leak', into the system, and then measuring the time period ($T_2$) over which the same pressure drop ($\Delta P_1$) occurs with the system leaking as a result of both the actual leak and the 'artificial leak'.

The leak rate of the installation is obtained from the equation:

$$\text{Leak Rate} = \frac{F \times T_2}{T_1 - T_2}$$

where F is the known flow rate through the artificial leak measured at the same pressure.

The above described methods are carried out manually employing a so-called 'U gauge' manometer to measure the pressure drops and a stop watch to measure the time periods.

SUMMARY OF THE INVENTION

An object of the invention is to provide a method for measuring leak rate which avoids having to repressurise the system and apparatus for carrying out the method.

According to one aspect of the invention, there is provided a method of determining the rate of leakage of fluid from a leaking fluid containing system, the method comprising pressurising the system, terminating the pressurisation, monitoring from a start time ($T_o$) and pressure ($P_o$) a first drop in pressure in the system and the time, determining the time taken ($T_1$) for the pressure in the system to drop by a predetermined pressure drop ($\Delta P_1$) to pressure $P_1$, or where $\Delta P_1$ has not been reached in a time less than a predetermined time ($T_2$), determining pressure drop ($\Delta P_2$) to pressure $P_1$ over the predetermined time $T_2$, and then, without repressurising the system, monitoring from a new start time which substantially coincides with the end of the time period ($T_1$) or the predetermined time period ($T_2$), the time taken ($T_3$) for a second drop in the pressure in the system ($\Delta P_3$) through the actual leak in the system and a calibrated leak introduced into the system combined, where $\Delta P_3 = (\Delta P_1 \text{ or } \Delta P_2) \times K$, whichever of $\Delta P_1$ and $\Delta P_2$ was determined initially being applicable and K being a constant, and calculating the actual leakage rate according to the following formula $$\text{Leak Rate} = \frac{C \times [\text{calibrated leak rate}] \times T_3}{(T_1 \text{ or } T_2) - T_3}$$

where C is a constant.

Constant K, referred to above may be equal to 1, in which case $\Delta P_3 = \Delta P_1$ or $\Delta P_2$, as appropriate.

However, Applicants have found that more accurate leak rate measurement results can be obtained if the leak rate equation takes account (at least to some extent) of the fact that the second pressure drop starts from a lower pressure than the first pressure drop and that the discharge rate through the actual or real leak will thus be reduced during the second pressure measurement compared with the position if it has been measured compared with the position if it had been measured at the initial higher starting pressure ($P_o$). More specifically, Applicants have obtained such more accurate results by requiring the second pressure drop $\Delta P_3$ over which $T_3$ is to be determined to have substantially the same fractional change as the first pressure drop $\Delta P1$ or $\Delta P_2$; in which case, in the equation:

$$\Delta P_3 = (\Delta P_1 \text{ or } \Delta P_2) \times K$$

$$K = \frac{P_o - \Delta P_1}{P_o} \text{ or } \frac{P_o - \Delta P_2}{P_o}, \text{ as appropriate}$$

$$\text{Also, } K = \frac{P_1}{P_o} \text{ or } \frac{P_L}{P_o}, \text{ as appropriate.}$$

The method may be employed in monitoring a fuel gas system comprising a gas meter, pipework between the gas meter and a stop cock or valve located upstream of the inlet to the meter, and pipework between the outlet of the meter and the gas control valve(s) of one or more gas-fired appliances located downstream of the meter. In such a case the method includes, prior to pressurising the system, closing the stop valve and the or each gas control valve, pressurising the system by opening the stop valve to allow gas into the system, and then closing the stop valve to produce an isolated system.

After terminating pressurisation of the system and prior to monitoring the first drop in pressure in the system, the pressure in the system may conveniently be checked to ensure that the pressure is no longer rising before initiating the monitoring of the first drop in pressure in the system. If the check indicates that the pressure in the system is still rising, this usually means one of two things. Firstly, that the stop valve is faulty and is still allowing gas from the supply source past it into the system to be monitored. In such a case the stop valve should be replaced before the test can be carried out for gas leakage from the system. Secondly, that the system has not yet stabilised. In which case the start time of the period over which the first pressure drop in the system is measured is delayed until the pressure in the system has stabilised. In the present context 'stabilisation' means the situation where the pressure in the system is either constant or falling.

However, where the system incorporates a gas pressure regulator or governor between the stop cock and the inlet to the meter, the pressure may initially rise on closing the stop cock before it starts to fall. This may be caused by so-called governor lock-up where the governor prevents release of further gas to the downstream part of the system. This occurs when the meter governor is designed to 'lock-up' if the downstream gas pressure exceeds a predetermined maximum. It is possible that the part of the system downstream of the governor could be pressurised to a pressure greater than the predetermined allowable maximum if the line pressure upstream of the stop cock exceeds this value and the downstream part of the pipework is initially pressurised by rapidly opening and closing the stop clock. The governor would then lock up. As the system leaks and the pressure drops the governor would then unlock and release gas from the pipework between the stop cock and the governor to the downstream part of the system. The pressure in the isolated downstream part of the system could then initially increase rather than decrease.

According to another aspect of the invention, there is provided apparatus for use in determining the rate of leakage of fluid from a fluid containing system, the apparatus comprising:

inlet means for receiving fluid from the system, conduit means connecting the inlet to fluid pressure sensing means, valve means selectively openable to connect a calibrated orifice means to the conduit means, data storage means, data processing means, data display means, programmed control means, and means operable to initiate, from a start time and with the valve means closed, the control means to monitor drop in pressure in the system, as measured by the pressure sensing means, with time to establish if a predetermined pressure drop $\Delta P_1$ occurs in a time $T_1$ less than a predetermined time $T_2$, and if so to store data representing $\Delta P_1$ and $T_1$ in the data storage means, but if $\Delta P_1$ is not reached by predetermined time $T_2$ to store in the data storage means data representing $T_2$ and the pressure drop $\Delta P_2$ which has occurred by time $T_2$; and then from a new start time, which substantially coincides with the time $T_1$ (where $\Delta P_1$ has been stored) or time $T_2$ (where $\Delta P_2$ has been stored), to open the valve means, whereby when the apparatus is in use the calibrated orifice is placed in communication with the fluid conduit and thus with the system via the inlet, and to establish the time taken $T_3$ for the pressure as sensed by the pressure sensing means to drop by $\Delta P_1$ (where $\Delta P_1$ has been stored) or by $\Delta P_2$ (where $\Delta P_2$ has been stored), and to store data representing $T_3$ in the data storage means; and to input into the data processing means from the data storage means data representing $T_1$ or $T_2$ and $T_3$, the data processing means being programmed to calculate the rate of leakage of the system using the formula, leak rate=

$$\frac{C \times [\text{calibrated leak rate}] \times T_3}{(T_1 \text{ or } T_2) - T_3}$$

where C is a constant; and to cause the calculated leak rate to be displayed on the data display means.

According to a further aspect of the invention, there is provided apparatus for use in determining the rate of leakage of fluid from a fluid containing system, the apparatus comprising:

inlet means for receiving fluid from the system, conduit means connecting the inlet to fluid pressure sensing means, valve means selectively openable to connect a calibrated orifice means to the conduit means, data storage means, data processing means, data display means, programmed control means, and means operable to initiate, from a start time and start pressure $P_o$, with the valve means closed, the control means to monitor drop in pressure in the system, as measured by the pressure sensing means, with time to establish if a predetermined pressure drop $\Delta P_1$ to pressure $P_1$ occurs in a time $T_1$ less than a predetermined time $T_2$, and if so to store data representing $\Delta P_1$ and $T_1$ or $\Delta P_1$, $P_1$ and $T_1$, in the data storage means, but if $\Delta P_1$ is not reached by predetermined time $T_2$ to store in the data storage means data representing $T_2$ and the pressure drop $\Delta P_2$ to pressure $P_L$ which has occurred by time $T_2$, or $\Delta P_2$, $P_L$ and $T_2$; and then from a new start time, which substantially coincides with the time $T_1$ (where $\Delta P_1$ has been stored) or time $T_2$ (where $\Delta P_2$ has been stored), to open the valve means, whereby when the apparatus is in use the calibrated orifice is placed in communication with the fluid conduit and thus with the system via the inlet, to input into the data processing means from the data storage means data representing $\Delta P_1$ or $\Delta P_2$, whichever has been stored, the data processing means being programmed to calculate a second pressure drop $\Delta P_3$ in the system to be sensed by the pressure sensing means using the formula $\Delta P_3 = (\Delta P_1$ or $\Delta P_2) \times K$, wherein K is a constant, to store data representing $\Delta P_3$ in the data storage means, and to establish the time taken $T_3$ for the pressure as sensed by the pressure sensing means to drop by $\Delta P_3$, and to store data representing $T_3$ in the data storage means; and to input into the data processing means from the data storage means data representing $T_1$ or $T_2$ and $T_3$, the data processing means being programmed to calculate the rate of leakage of the system using the formula, leak rate=

$$\frac{C \times [\text{calibrated leak rate}] \times T_3}{(T_1 \text{ or } T_2) - T_3}$$

where C is a constant; and to cause the calculated leak rate to be displayed on the data display means.

As indicated above, preferably $$\text{constant } K = \frac{P_o - (\Delta P_1 \text{ or } \Delta P_2)}{P_o} = \frac{P_1 \text{ or } PL}{P_o}$$

In such a case the apparatus data storage means stores data representing start pressure $P_o$, and from the data storage means data representing $P_o$ and $\Delta P_1$ or $\Delta P_2$ is input into the data processing means which is programmed to calculate K according to the formula $$K = \frac{P_o - (\Delta P_1 \text{ or } \Delta P_2)}{P_o}$$

for use in the formula for calculating $\Delta P_3$. Alternatively, in addition to data representing $P_o$ being stored, data representing $P_1$ and $P_L$ is stored in the data storage means, and from the data storage means data representing $P_o$, $P_1$ and $P_L$ is input into the data processing means which is programmed to calculate K according to the formula $$K = \frac{P_1 \text{ or } P_L}{P_o}$$

for use in calculating $\Delta P_3$.

The control means may be programmed so that the apparatus does not start to monitor pressure drop in the system unless the existing pressure is greater than a predetermined pressure. In such a case the display leak rate determining process is terminated, and means may be caused to indicate that the pressure must be above the predetermined pressure. The user of the apparatus may then decide to pressurise the system further by opening the stop cock again and then initiating the leak rate determination process again.

The control means may also be programmed to determine (a) if $T_1$ is less than a predetermined minimum time $T_{min}$ and if so to cause the leak rate determining process to be terminated and to cause the display means to indicate that the leak is too large to be measured accurately by the apparatus; and (b) if $\Delta P_2$ is less than a predetermined minimum pressure drop $\Delta P_{min}$ and if so to cause the leak rate determining process to be terminated and to cause the display means to indicate that the leak is too small to be measured accurately by the apparatus.

In addition the control means may be programmed to determine if $T_3$ is larger than $T_1$ or $T_2$ (whichever is applicable) and if so to cause the leak rate determining process to be terminated and to cause the display means to indicate that there is an error.

The programmed control means may also be operable by initiating means, as an alternative to the leak rate monitoring programme described, to cause pressure of the fluid being sensed by the pressure sensor to be displayed by the data display means. Such a facility may be used to check that the pressure in the system is not rising before initiating the programmed control unit to determine leak rate.

The programmed control means may further also be operable by initiating means to monitor drop in pressure $\Delta P_x$ in the system, as measured by the pressure sensing means, from a start time over a predetermined time period $T_y$, and causing the data display means to display, at the end of the predetermined time period $T_y$, both $\Delta P_x$ and $T_y$.

Between the start time and time $T_y$ the display means may display at regular time intervals the current pressure and the time remaining before $T_y$ is reached, for example on a second to second interval basis.

BRIEF DESCRIPTION OF THE DRAWINGS

The invention will now be illustrated by way of example only, with reference to the accompanying drawings, in which.

DISCUSSION OF THE PREFERRED EMBODIMENTS

Figure 1:
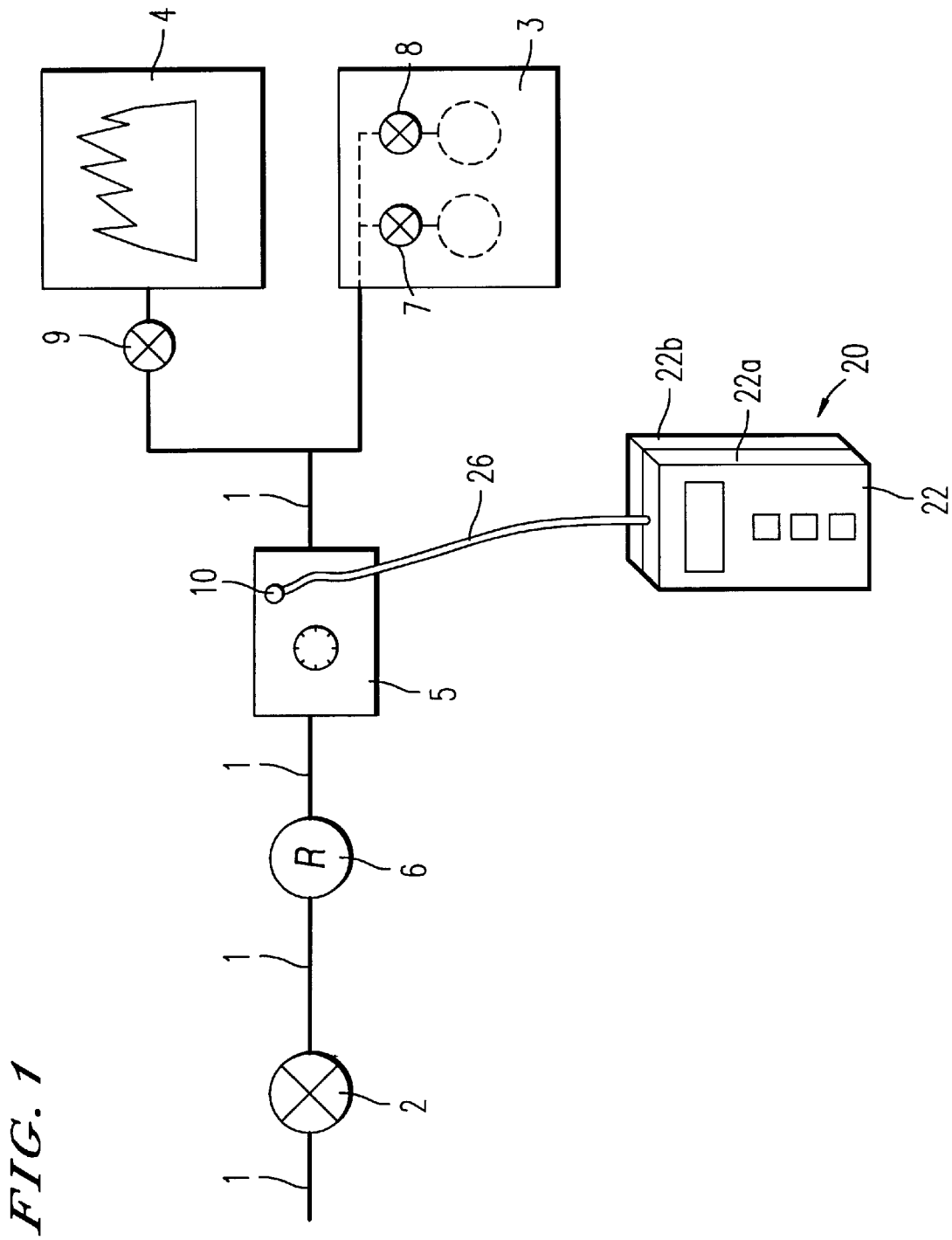
FIG. 1 is a schematic view of part of a domestic fuel gas system.

FIG. 1 schematically illustrates part of a domestic fuel gas system or installation as an example of the kind of fluid containing system on which the method and apparatus may be used in order to determine the leak rate of fluid escaping from the system.

The system comprises a gas supply pipe 1 connected to a gas main (not shown). A stop cock 2 is provided for closing off the pipe and preventing supply of gas to downstream gas-fired appliances 3 and 4 via gas meter 5.

A gas regulator or governor 6 is provided between the stop cock 2 and the gas meter 5. The gas-fired appliances 3 and 4 have associated therewith gas control valves 7, 8 and 9 via which gas can be prevented from passing through the appliances. The gas meter 5 has a normally closed tapping hole 10 via which access may be had to the interior of the system on using an appropriate tool or instrument to manipulate the tapping hole to an open position.

Figure 2:
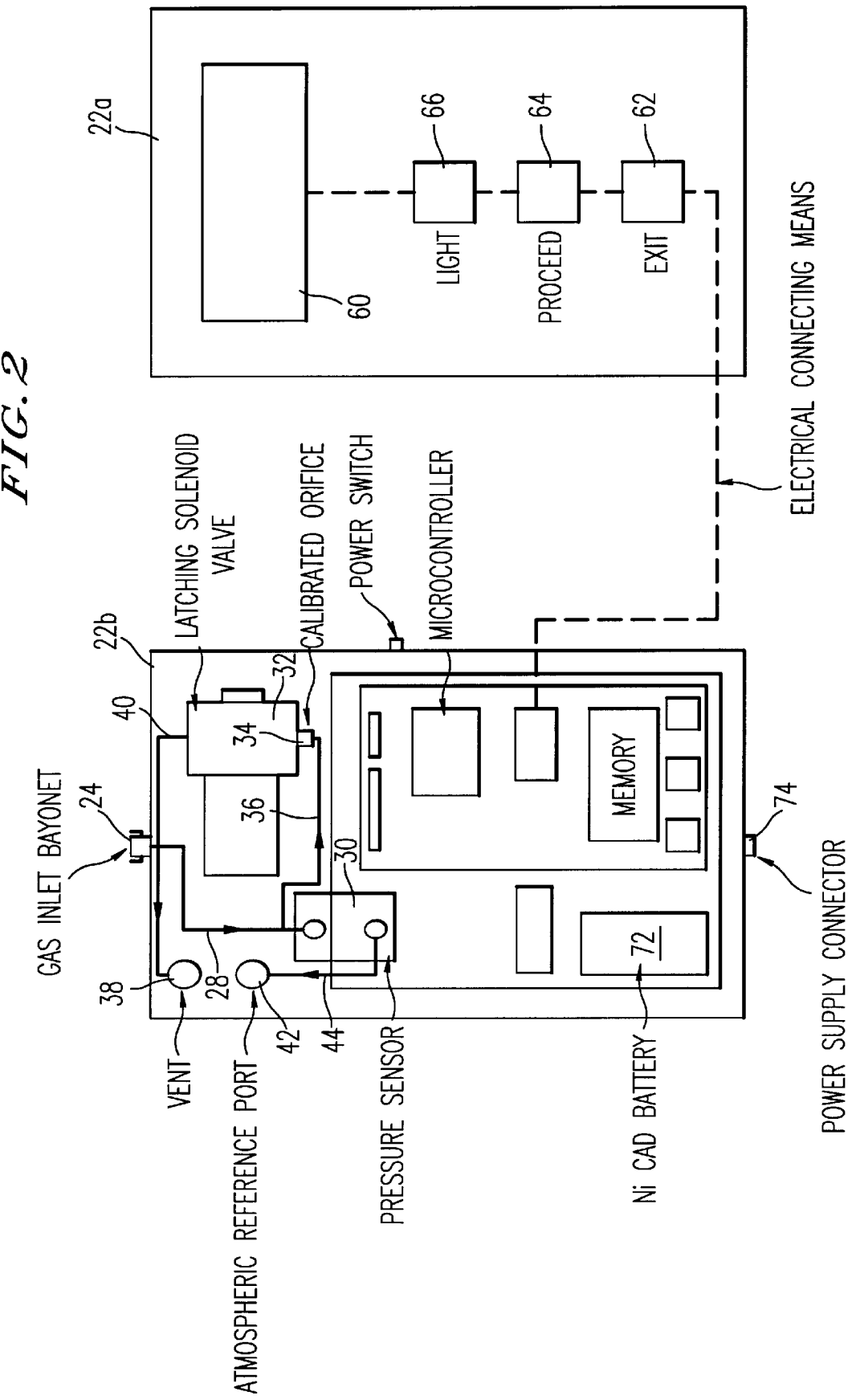
FIG. 2 is a schematic view of the front panel and interior of one apparatus according to the invention.
Figure 3:
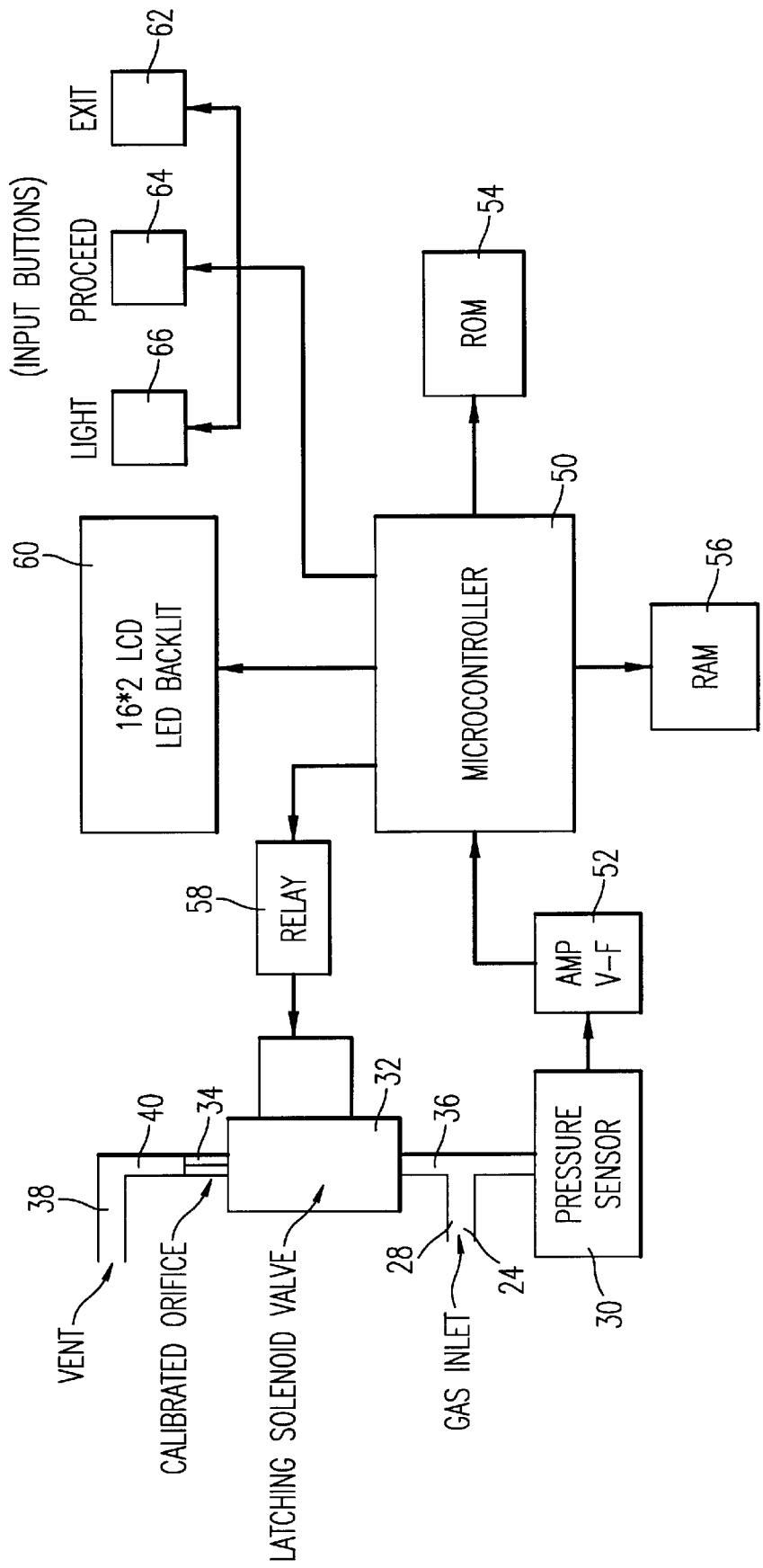
FIG. 3 is another schematic view of the apparatus, and FIGS. 4a, 4b, 4c, 4d, 4e, 4e' and 4f shows a flow chart of operating sequences for the apparatus of FIGS. 2 and 3.
Figure 4A:
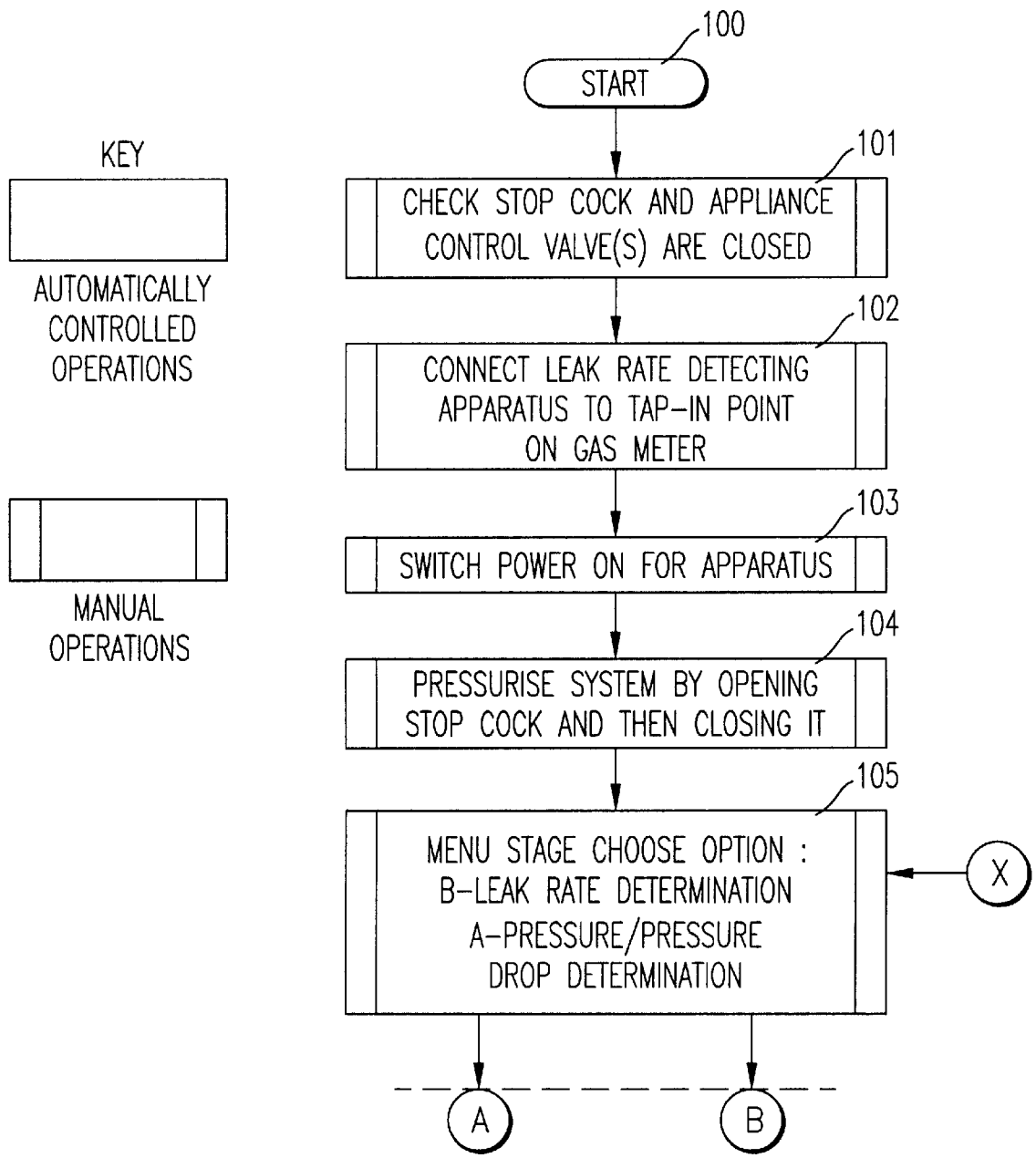
Figure 4B:
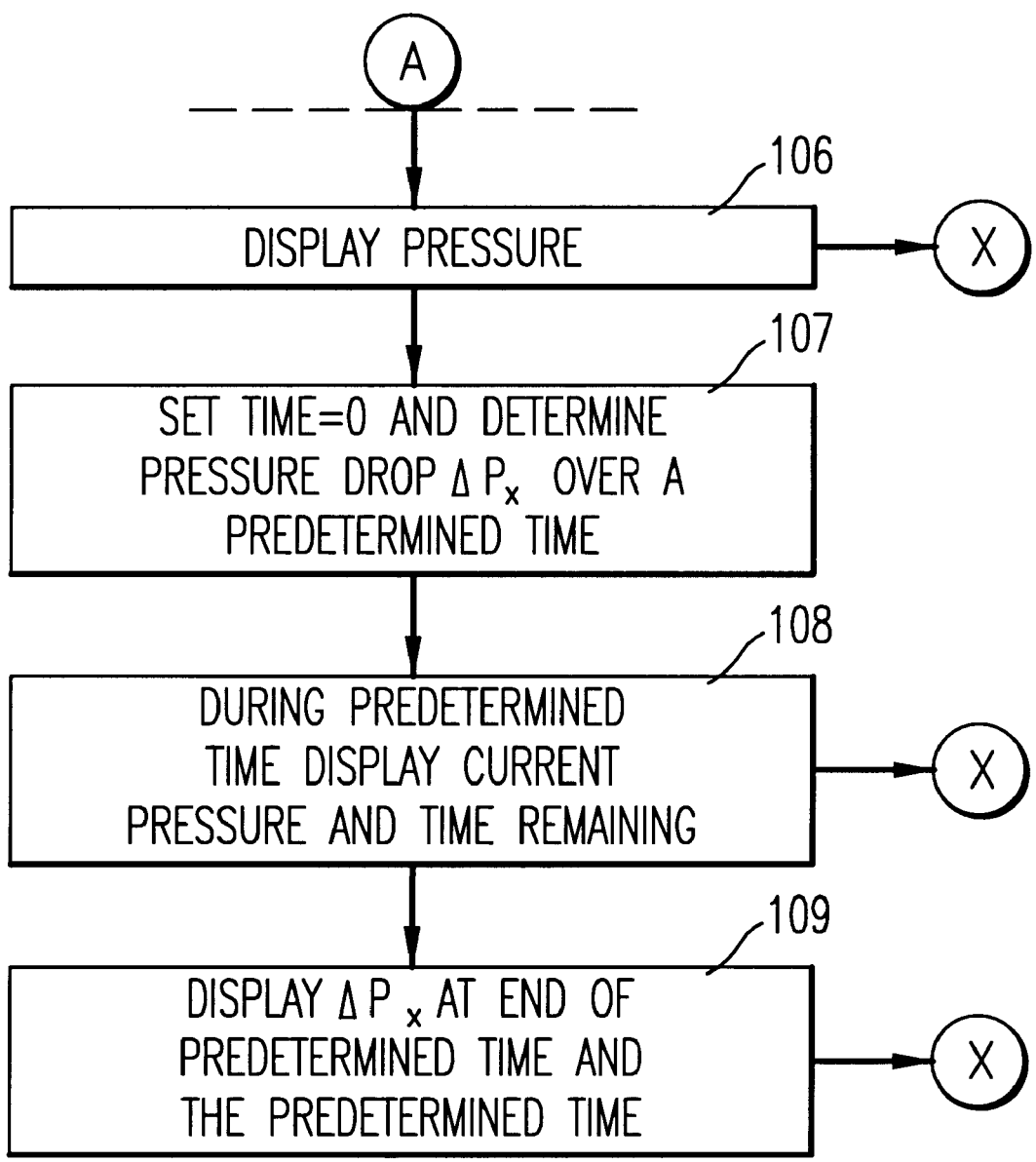
Figure 4C:
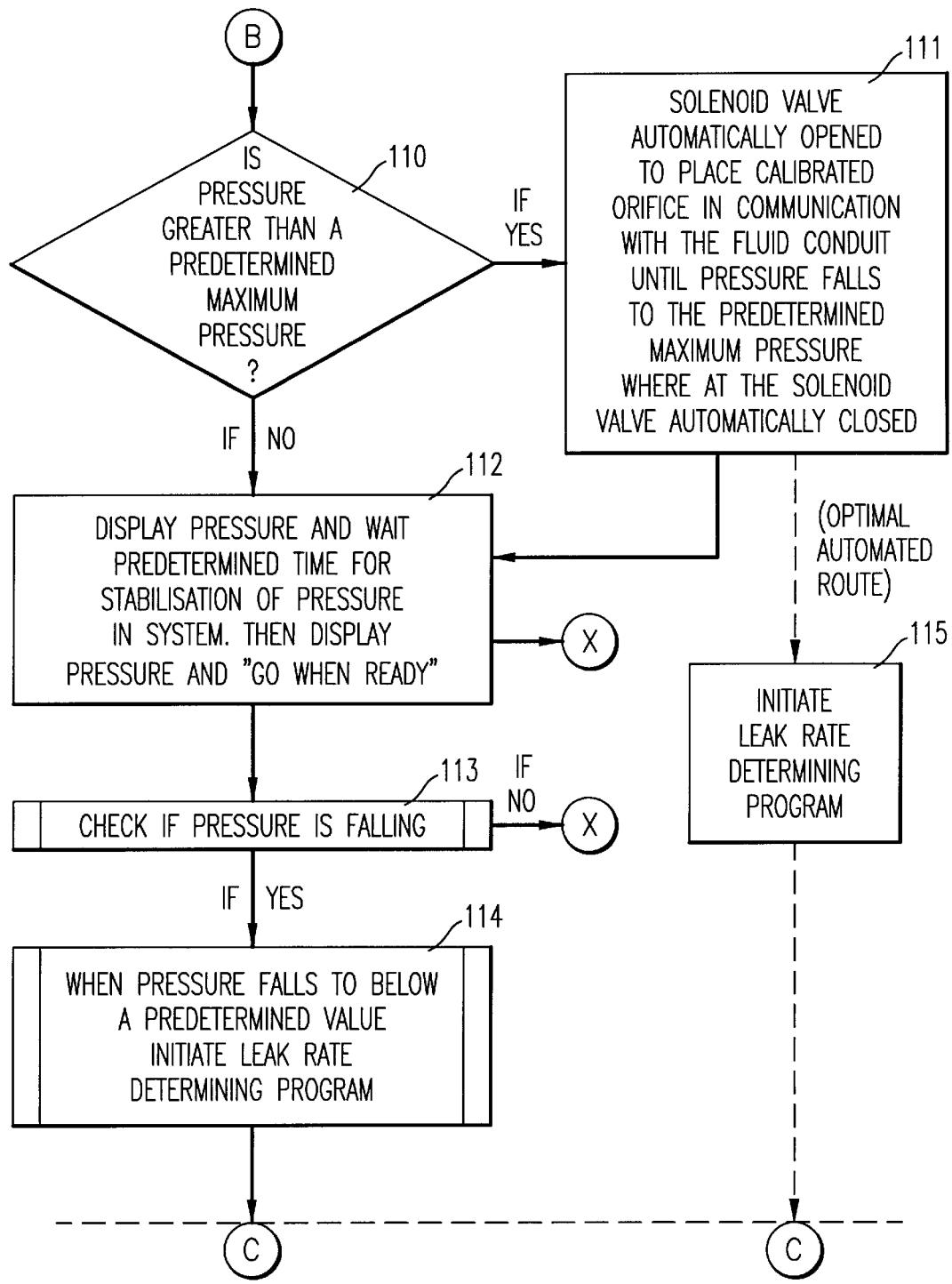
Figure 4D:
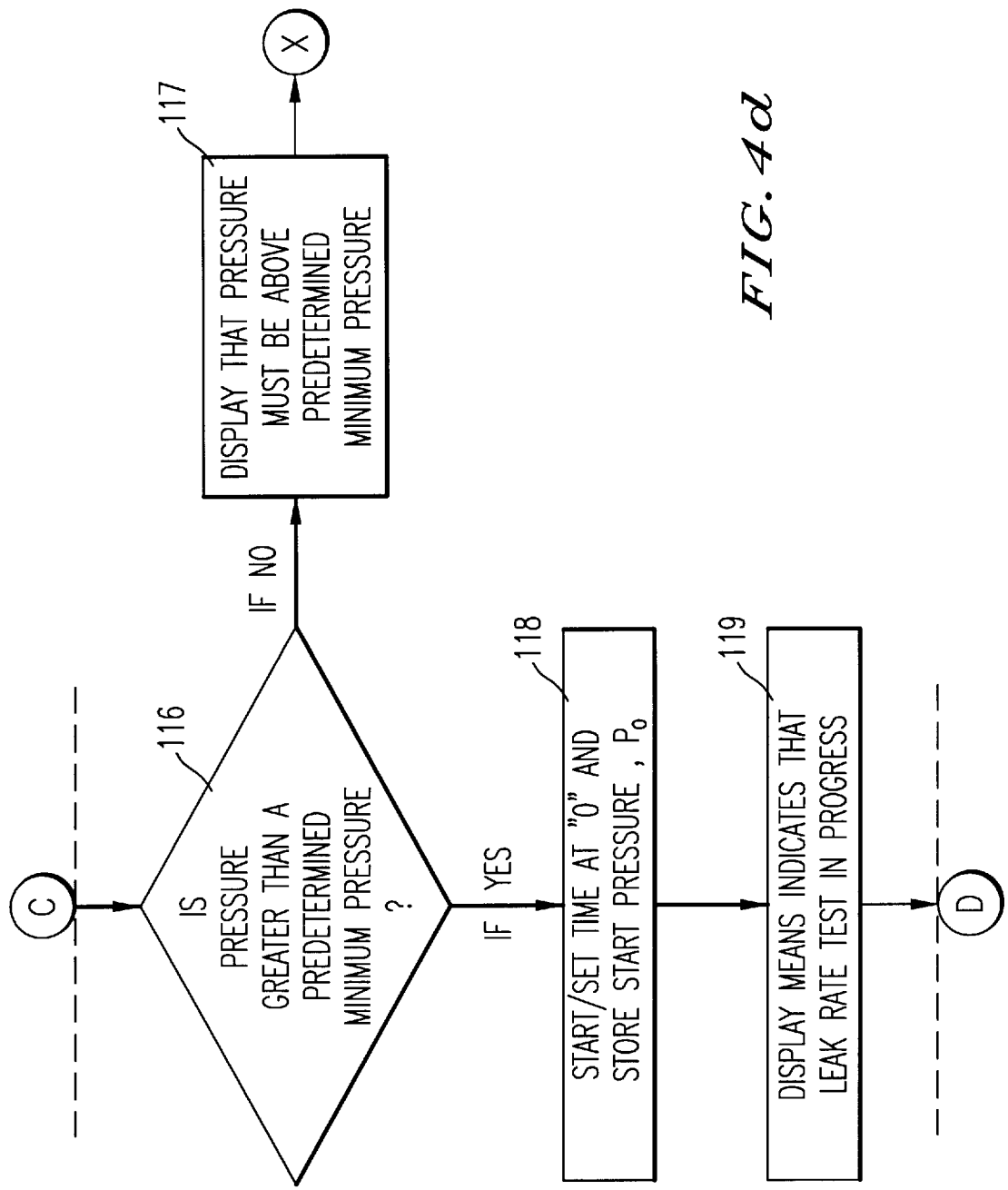
Figure 4E:
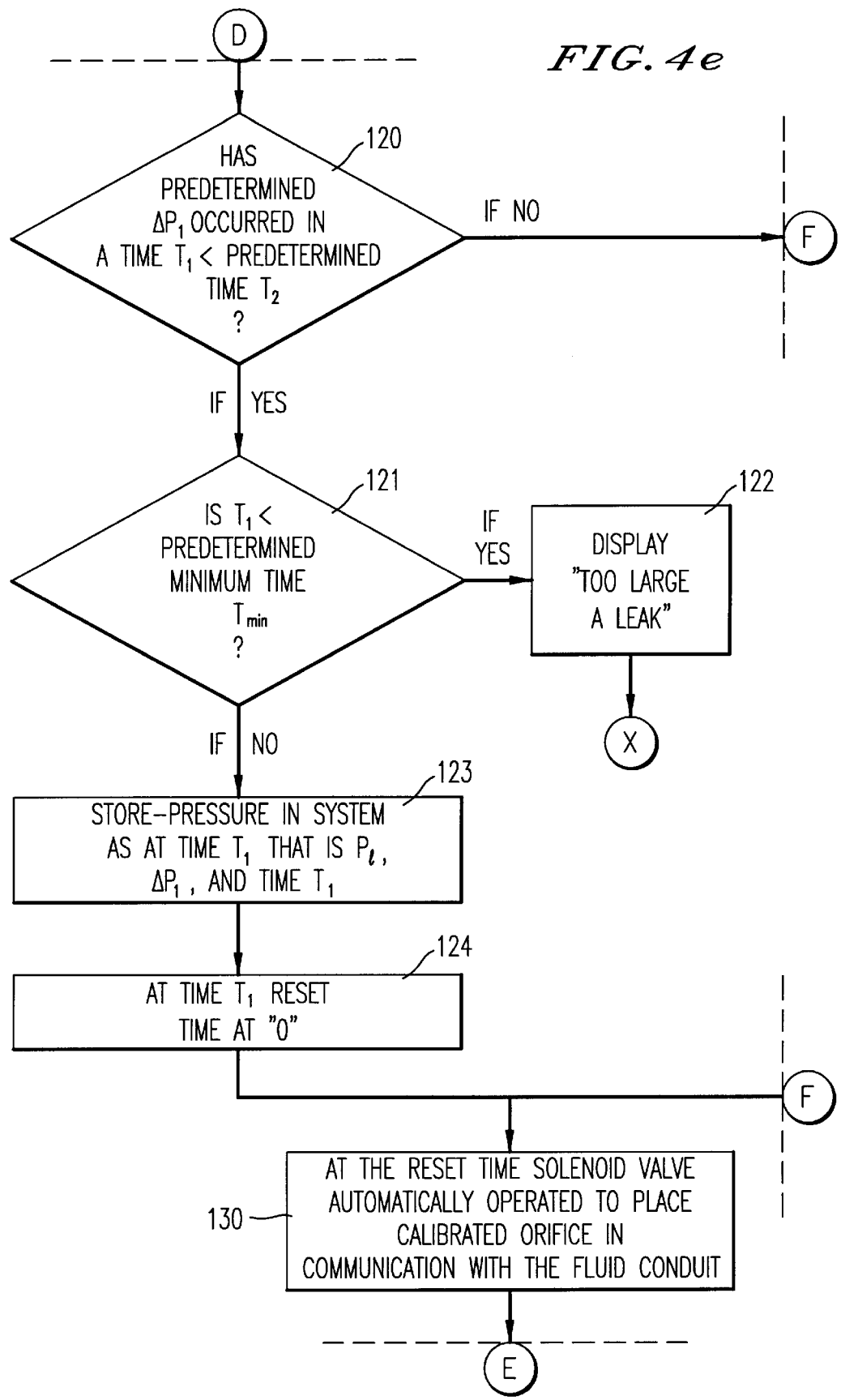
Figure 4E:
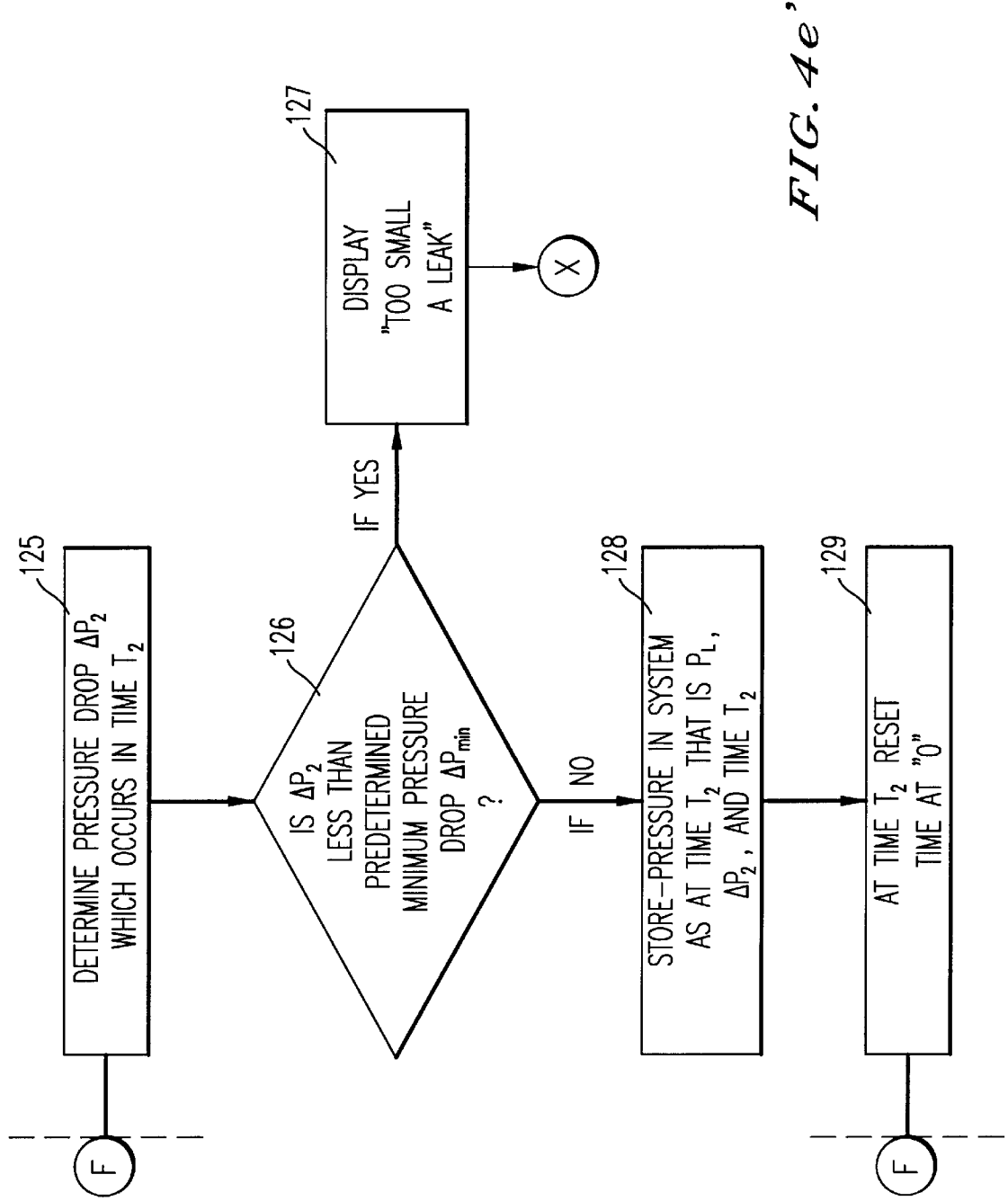
Figure 4F:
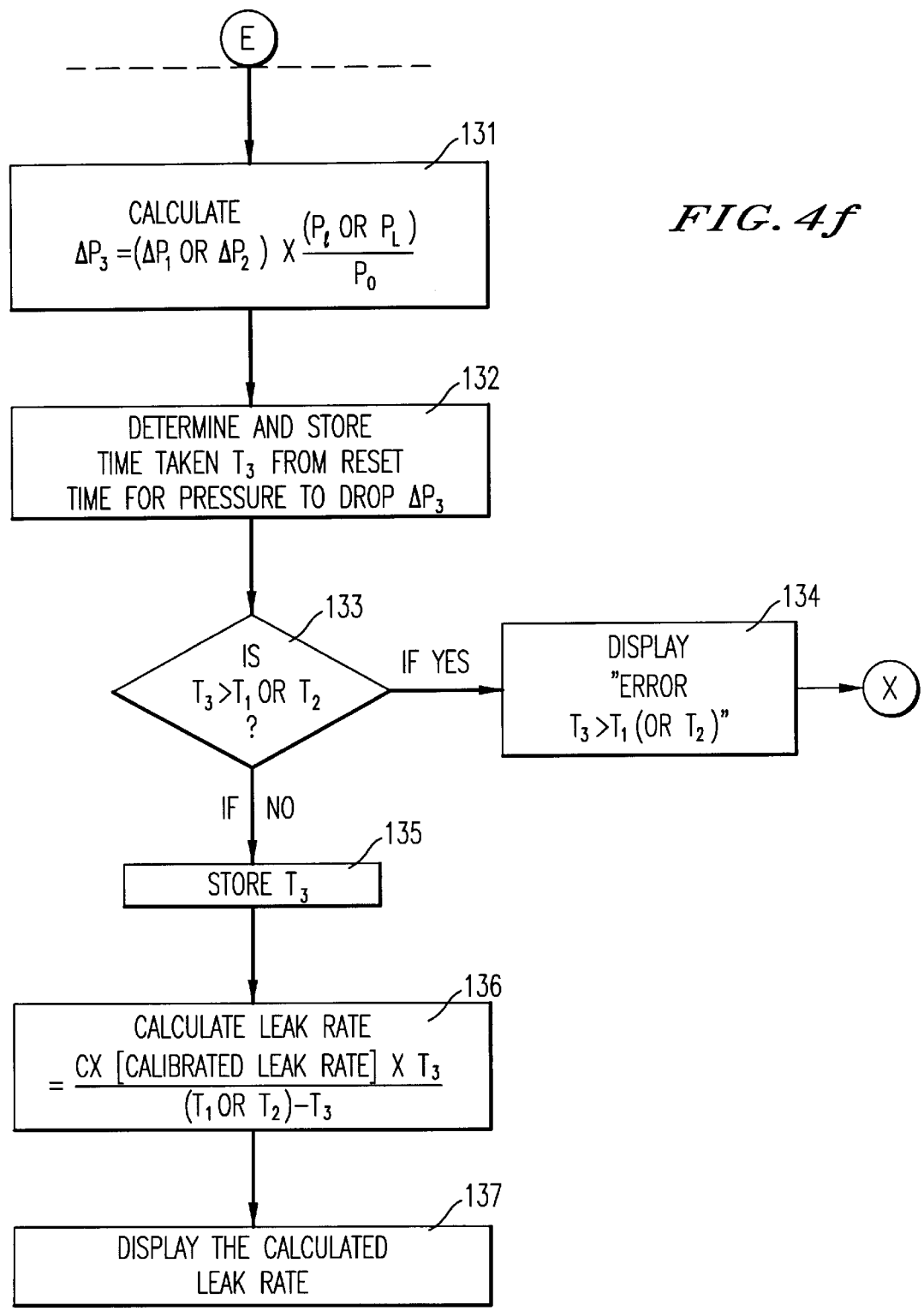

The apparatus 20 schematically illustrated in FIGS. 2 and 3 comprises upper and lower body parts 22a and 22b which form a housing 22 which may, conveniently be sized, to be held in the hand.

The lower body part 22b includes an inlet means 24 via which the apparatus can be connected to the tapping hole 10 by means of, for example, a length of flexible tubing 26 (see FIG. 1). A fluid conduit 28 connects the inlet 24 to fluid pressure sensing means 30 which preferably is of a kind which compensates at least to some extent for changes in temperature. A valve means 32, which in this example is a latching solenoid valve, is selectively operable to connect a calibrated orifice 34 to the conduit means 28 via line 36. The calibrated orifice 34 can be connected to a vent 38 to atmosphere via line 40. The pressure sensing means 30 is connected to an atmospheric reference port 42 to provide gauge pressure, or this could be sealed to provide a differential or absolute pressure reading, via line 44. The pressure sensing means 30 is connected to a micro-controller 50 via an amplifier 52. The micro-controller enables various programmed operations to be carried out automatically once the appropriate programme has been initiated. The micro-controller 50 is also connected to: A ROM 54 the function of which here is to hold the read only computer programme; a RAM 56, one function of which here is to store the measured variables of pressure and time; a relay 58 which connects the micro-controller to the solenoid valve 32; and a data display means 60 in the form of LCD which is located on the front panel 22a.

It will be appreciated that the micro-controller 50 includes data processing means for performing mathematical calculations in accordance with the programmed control.

Input signals for instructing the micro-controller and initiating the chosen programme (as will be described below) are achieved by operating buttons 62, 64, 66 located on the front panel.

To conserve battery power the light for the display may be programmed such that it remains "on" for a limited time period only.

A Ni Cad battery 72 is used for supplying electrical energy to the instrument. The Ni Cad battery may be recharged through an external battery charging arrangement, for example by means of a household mains power supply via connector/socket 74.

FIGS. 4a, 4b, 4c, 4d, 4e, and 4e' show a flow chart of operating and programmed control sequences. In FIG. 4, as shown by the key, the plain boxes are automatically controlled operations and those with double edging are manual operations. Going through the chart in sequence, at the start 100 a manual check is made at stage 101 to ensure that the stop cock 2 and the appliance valves 7, 8 and 9 are closed. The inlet 24 of the apparatus 20 is connected to the system at the tap-in-point 10 on the gas meter 5 by means of the flexible tubing 26—stage 102. The power, for example from the battery 72, is switched on at stage 103 and this is indicated by the LCD 60 being activated. Optionally, at this stage the display means 60 may inform the user to open the gas inlet means 24 to atmosphere. This will provide equal pressures to both sides of the pressure sensor enabling a software routine (not shown) for the pressure sensor 30 to zero itself, whereafter the button 64 may be pressed to clear the display. At stage 104 the system between the stop cock 2 and the valves 7, 8 and 9 is pressurised by opening the stop cock and then closing it. After this the 'menu stage' 105 is reached at which there are two options: Option A—to view the current pressure as it changes with time, for example on a second to second basis, and then, if desired, to initiate a control programme for determining the pressure change in the system over a predetermined time period; and Option B—to initiate a control programme for determining leak rate of gas from the system.

Option A will be described first. When button 62 is pressed the display means 60 continually displays the pressure of the isolated system—stage 106. From stage 106, if desired, button 64 may be pressed in order for the apparatus to measure from a start time pressure drop in the system over a predetermined period, for example, 2 minutes—stage 107. Optionally, a 'stabilisation' time period may be introduced prior to commencement of the measurement of the pressure drop. The purpose of the 'stabilisation' time period here is to avoid pressure fluctuations due to, for example, temperature or governor effects. During the predetermined time period the display means displays the existing pressure and the time remaining before the predetermined time is reached—stage 108. At the end of the predetermined time the display means displays predetermined time period and the pressure drop that has been measured in the predetermined period—stage 109. At any of stages 106, 108 and 109, the procedure may be returned to stage 105, i.e. the menu stage by pressing button 62.

Option B, which may be followed from stage 105 by pressing button 64, will now be described. On pressing button 64, the apparatus automatically determines if the current pressure in the system is greater than a predetermined maximum pressure—stage 110. If yes, the solenoid valve automatically opens to place the artificial calibrated orifice in communication with the fluid conduit until the pressure falls to a predetermined maximum pressure whereat the solenoid valve automatically closes the calibrated orifice—stage 111, from which the programme proceeds to stage 112 whereat the display means displays the pressure and to wait a predetermined 'stabilisation' time period. At the end of the 'stabilisation' time period the display means displays the current pressure and "go when ready" to complete stage 112. If at stage 110 the pressure is not greater than a predetermined maximum pressure, the programme proceeds to stage 112 as described above. Following stage 112 a check is made at stage 113 to see if the display means indicates that the pressure is falling or starting to fall, and if it does then when the pressure has fallen to below a predetermined value the button 64 may be pressed again to initiate the leak rate determining program—stage 114.

If the pressure check at stage 113 indicates that the pressure is not falling but is constant this may indicate that the system is not leaking or, and perhaps less likely, that the stop cock and/or regulator is/are allowing upstream gas into the system at the same rate that a leak in the system is allowing gas to leak from it. If the pressure check shows that the pressure is still rising, even after the stabilisation period, for example of 1 minute, this indicates that the stop cock is leaking and still allowing gas from the gas main into the portion of the system under test. As indicated earlier the stop cock would have to be replaced before the test is carried out. The apparatus may be programmed to indicate that the stop cock may require replacement. Since gas from the system and air have different flow rates through any given opening or aperture, any air present in the tubing 26 from the meter to the apparatus which flows through the calibrated orifice instead of gas could result in an incorrectly determined leak rate. To reduce or alleviate this potential problem the apparatus may be operated manually or automatically so as to cause the latching solenoid valve to open for, say 10 seconds during the stabilisation period in order to flush some of the air out of the tubing 26 and through the calibrated orifice 34.

Stages 110 and 111 accommodate the possibility that the pressure may initially rise on closing the stop cock 2 before beginning to fall, for example as a result of governor lock-up as described earlier. Thus, the apparatus may be designed so that the latching solenoid valve controlling the opening/closing of the artificial leak or calibrated orifice automatically opens the orifice if the pressure in the downstream part of the system exceeds a predetermined pressure with the orifice remaining open until the pressure falls to a value below the predetermined pressure, whereat the solenoid valve then closes the orifice. Thereafter, optionally, the programme may proceed from stage 111, via an automated route to stage 115 where the leak rate measurement determining programme is initiated. This provides a fast method of reducing pressure in the system following governor lock-up. Alternatively, the tubing may be manually purged with gas by the user prior to measurements being taken by the apparatus, and to facilitate this the tubing and the apparatus may be provided with quick-release co-operating couplings.

Assuming that stage 114 (or 115) is reached, then the apparatus automatically determines if the current pressure in the system is greater than a predetermined minimum pressure—stage 116. If it is not, the display means displays that the pressure of the system must be above the predetermined minimum pressure and is an indication that the leak rate determination process was initiated with the system pressure too low—stage 117.

At any of stages 112, 113 or 117 the process may be returned to the menu stage 105, and the preceding pressurising stage may be repeated, for example to raise the pressure of the system sufficiently for it to be greater than the predetermined minimum pressure at stage 116.

Thus, providing the pressure is greater than the predetermined pressure at stage 116 the programme proceeds to stage 118 whereat the time is set as the 'start time' and the pressure, $P_o$, at the start time is stored in RAM 56, and then the display means indicates that the leak rate test is in progress by, for example, displaying a lighted LED or the information "wait . . . test in progress"—stage 119. Following stages 118 and 119, the apparatus automatically determines if a predetermined pressure drop $\Delta P_1$ has occurred in a time $T_1$ which is less than a predetermined time $T_2$—stage 120. If yes, it is then determined if $T_1$ is less than a predetermined minimum time $T_{min}$—stage 121: if yes, the display means indicates that the leak is too large to be measured and the test is terminated—stage 122; whereas, if no, $P_1$, $\Delta P_1$ and $T_1$ are stored and the time is reset from the time $T_1$—stages 123 and 124. If at stage 120, $\Delta P_1$ has not occurred in a time less than time $T_2$, the pressure drop $\Delta P_2$ that occurs in time $T_2$ is determined—stage 125. It is then determined if $\Delta P_2$ is less than predetermined minimum pressure drop $\Delta P_{min}$—stage 126: if yes, the display means indicates that the leak is too small to be measured and the test is terminated—stage 127; whereas, if no, $P_1$, $\Delta P_2$ and $T_2$ are stored and the time is reset from the time $T_2$—stages 128 and 129.

Coincident with stage 124 or 129, at the reset time $T_1$ or $T_2$, as applicable, the solenoid valve 32 is automatically operated to place the calibrated orifice in communication with the fluid conduit so that the system is leaking from both the actual leak in the system and the introduced calibrated leak—stage 130. Using $\Delta P_1$ and $P_1$, or $\Delta P_2$ and $P_L$, as applicable, and $P_o$, $\Delta P_3$ is calculated at stage 131 according to the formula shown. The time taken $T_3$ from the reset time for the pressure drop $\Delta P_3$ to occur is then determined and stored—stage 132.

At stage 133 it is determined if $T_3$ is greater than $T_1$ or $T_2$ (as applicable) : if yes, the display means indicates that there is an error and the test is terminated—stage 134; if no, $T_3$ is stored—stage 135. Using $T_1$ or $T_2$, and $T_3$, the leak rate of the actual leak is calculated at stage 136 according to the formula:

$$\text{Leak Rate} = \frac{C \times [\text{calibrated leak rate}] \times T_3}{(T_1 \text{ or } T_2) - T_3}$$

The display means then displays the calculated leak rate—stage 137.

By way of illustration only, in one of the system portions of a gas installation tested, using the method and apparatus according to the invention, the volume of the isolated system, including the gas meter and associated governor was approximately 10 liters. The system was pressurised to about 20 mbar and the start of the leak rate test was delayed (stabilisation period) for about 1 minute. The predetermined pressure above which the pressure in the isolated system had to be at stage 113 for the test to continue to stage 115 was 18 mbar. At stage 117, the predetermined $\Delta P_1$ was 1.5 mbar and predetermined time $T_2$ was 20 seconds. At stage 126, the predetermined minimum pressure drop $\Delta P_{min}$ was 0.0668 mbar. At stage 136, the calibrated leak rate of the orifice used was 66 ml/min and the constant C used was 0.935.

The figure of 0.935 used as the constant was derived from experimental results on a wide range of system volumes and leak rates. The reason that the constant is not "1" is because the leakage of fluid through an orifice is not ideally proportional to pressure drop.

For total leak rates of less than 200 ml/min through leaks in the actual system, the results provided by the device were within about ±3% of the results when the leak rates were determined by a standard bubble flow meter measurement method.

Thus Applicants have found that when the actual leak in the system being investigated is between being somewhat smaller than, and not too much greater than, the calibrated leak then the hand-held apparatus employed in the test described above was simple to use and gave quick and fairly accurate leak rate measurements when compared with reference measurements obtained by much slower and less convenient methods known to provide accurate results.

It will be appreciated that this readily portable apparatus allows engineers to carry out service checks on domestic gas installations in customers homes in relatively little time.

Whilst a particular embodiment of the invention has been described above, it will be appreciated that various modifications may be made without departing from the scope of the invention. For example, the front panel may have a different number and or arrangement of operating buttons for pressing to initiate the different functions or programmes of the apparatus. Also, there may be small LED's associated with each button on the panel to indicate to the user of the apparatus which function, e.g. leak rate determining mode, is currently in operation. The display may simply provide the pressure readings or leak rates. Furthermore, the battery for supplying power to the apparatus need not be contained within the housing 22 but may be incorporated in a separate plug-in unit or device which is plugged into the housing when required.

It would also be possible particularly in a fully automated operational sequence to replace the menu driven procedure by a simple display of the pressure and time values and a series of LED indicators showing the various stages of the test routine.

What is claimed is:

1. A method of determining the rate of leakage of fluid from a leaking fluid containing system, the method comprising pressurising the system, terminating the pressurisation, monitoring from a start time ($T_o$) and pressure ($P_o$) a first drop in pressure in the system and the time, determining the time taken ($T_1$) for the pressure in the system to drop by a predetermined pressure drop ($\Delta P_1$) to pressure $P_l$, or where $\Delta P_1$ has not been reached in a time less than a predetermined time ($T_2$), determining pressure drop ($\Delta P_2$) to pressure $P_L$ over the predetermined time $T_2$, and then, without repressurising the system, monitoring from a new start time which substantially coincides with the end of the time period ($T_1$) or the predetermined time period ($T_2$), the time taken ($T_3$) for a second drop in the pressure in the system ($\Delta P_3$) through the actual leak in the system and a calibrated leak introduced into the system combined, where $\Delta P_3 = (\Delta P_1 \text{ or } \Delta P_2) \times K$, whichever of $\Delta P_1$ and $\Delta P_2$ was determined initially being applicable and K being a constant, and calculating the actual leakage rate according to the following formula $$\text{Leak Rate} = \frac{C \times [\text{calibrated leak rate}] \times T_3}{(T_1 \text{ or } T_2) - T_3}$$

where C is a constant.

2. A method as claimed in claim 1, in which K=1.

3. A method as claimed in claim 1, in which $$K = \frac{P_o - \Delta P_1}{P_o} \text{ or } \frac{P_o - \Delta P_2}{P_o}, \text{ as appropriate.}$$

4. A method as claimed in claim 1, in which C=0.935.

5. A method as claimed in claim 1, in which after terminating pressurisation of the system the pressure in the system is checked to ensure that the pressure is no longer rising before progressing.

6. Apparatus for use in determining the rate of leakage of fluid from a fluid containing system, the apparatus comprising:

inlet means for receiving fluid from the system, conduit means connecting the inlet to fluid pressure sensing means, valve means selectively openable to connect a calibrated orifice means to the conduit means, data storage means, data processing means, data display means, programmed control means, and means operable to initiate, from a start time and with the valve means closed, the control means to monitor drop in pressure in the system, as measured by the pressure sensing means, with time to establish if a predetermined pressure drop $\Delta P_1$ occurs in a time $T_1$ less than a predetermined time $T_2$, and if so to store data representing $\Delta P_1$ and $T_1$ in the data storage means, but if $\Delta P_1$ is not reached by predetermined time $T_2$ to store in the data storage means data representing $T_2$ and the pressure drop $\Delta P_2$ which has occurred by time $T_2$; and then from a new start time, which substantially coincides with the time $T_1$ (where $\Delta P_1$ has been stored) or time $T_2$ (where $\Delta P_2$ has been stored), to open the valve means, whereby when the apparatus is in use the calibrated orifice is placed in communication with the fluid conduit and thus with the system via the inlet, and to establish the time taken $T_3$ for the pressure as sensed by the pressure sensing means to drop by $\Delta P_l$ (where $\Delta P_1$ has been stored) or by $\Delta P_2$ (where $\Delta P_2$ has been stored), and to store data representing $T_3$ in the data storage means; and to input into the data processing means from the data storage means data representing $T_1$ or $T_2$ and $T_3$, the data processing means being programmed to calculate the rate of leakage of the system using the formula, $$\text{leak rate} = \frac{C \times [\text{calibrated leak rate}] \times T_3}{(T_1 \text{ or } T_2) - T_3}$$

where C is a constant; and to cause the calculated leak rate to be displayed on the data display means.

7. Apparatus as claimed in claim 6, in which the control means is also programmed so that the apparatus does not start to monitor pressure drop in the system unless the existing pressure is greater than a predetermined minimum pressure.

8. Apparatus as claimed in claim 7, in which when the existing pressure is not greater than the predetermined minimum pressure, display means indicate that the pressure must be above the predetermined minimum pressure.

9. Apparatus as claimed in claim 6, in which the control means is also programmed so that the apparatus does not start to monitor pressure drop in the system unless the existing pressure is not greater than a predetermined maximum pressure.

10. Apparatus as claimed in claim 9, in which when the existing pressure is greater than the predetermined maximum pressure, control means causes the valve means to open and place the calibrated orifice in communication with the fluid conduit means so that the pressure can fall to a predetermined maximum pressure whereupon the control means causes the valve means to close and terminate such present communication between the fluid conduit means and the calibrated orifice.

11. Apparatus as claimed in claim 6, in which the control means is also programmed to determine (a) if $T_1$ is less than a predetermined minimum time $T_{min}$ and if so to cause the leak rate determining process to be terminated and to cause the display means to indicate that the leak is too large to be measured accurately by the apparatus; and (b) if $\Delta P_2$ is less than a predetermined minimum pressure drop $\Delta P_{min}$ and if so to cause the leak rate determining process to be terminated and to cause the display means to indicate that the leak is too small to be measured accurately by the apparatus.

12. Apparatus as claimed in claim 6, in which the control means is also programmed to determine if $T_3$ is larger than $T_1$ or $T_2$ (whichever is applicable) and if so to cause the leak rate determining process to be terminated and to cause the display means to indicate that there is an error.

13. Apparatus as claimed in claim 6, in which the control means is also programmed and operable by initiating means, to cause pressure of the fluid being sensed by the pressure sensor to be displayed by the data display means.

14. Apparatus as claimed in claim 6, in which the control means is also programmed and operable by initiating means to monitor drop in pressure $\Delta P_x$ in the system, as measured by the pressure sensing means, from a start time over a predetermined time period $T_y$, and to cause the data display means to display, at the end of the predetermined time period $T_y$, both $\Delta P_x$ and $T_y$.

15. Apparatus as claimed in claim 14, in which between the start time and time $T_y$ the display means displays at regular time intervals the current pressure and the time remaining before $T_y$ is reached.

16. Apparatus as claimed in claim 6, in which the valve means is operable so as to be openable and closable with respect to atmosphere so that fluid from the system which enters through the inlet means can flush through the conduit means and the calibrated orifice means prior to the pressure drop in the system being monitored.

17. Apparatus for use in determining the rate of leakage of fluid from a fluid containing system, the apparatus comprising:

inlet means for receiving fluid from the system, conduit means connecting the inlet to fluid pressure sensing means, valve means selectively openable to connect a calibrated orifice means to the conduit means, data storage means, data processing means, data display means, programmed control means, and means operable to initiate, from a start time and start pressure $P_o$, with the valve means closed, the control means to monitor drop in pressure in the system, as measured by the pressure sensing means, with time to establish if a predetermined pressure drop $\Delta P_1$ to pressure $P_l$ occurs in a time $T_l$ less than a predetermined time $T_2$, and if so to store data representing $\Delta P_1$ and $T_1$ or $P_l$, $P_l$ and $T_l$, in the data storage means, but if $\Delta P_1$ is not reached by predetermined time $T_2$ to store in the data storage means data representing $T_2$ and the pressure drop $\Delta P_2$ to pressure $P_L$ which has occurred by time $T_2$, or $\Delta P_2$, $P_1$ and $T_2$; and then from a new start time, which substantially coincides with the time $T_1$ (where $\Delta P_1$ has been stored) or time $T_2$ (where $\Delta P_2$ has been stored), to open the valve means, whereby when the apparatus is in use the calibrated orifice is placed in communication with the fluid conduit and thus with the system via the inlet, to input into the data processing means from the data storage means data representing $\Delta P_1$ or $\Delta P_2$, whichever has been stored, the data processing means being programmed to calculate a second pressure drop $\Delta P_3$ in the system to be sensed by the pressure sensing means using the formula $\Delta P_3 = (\Delta P_1$ or $\Delta P_2) \times K$, wherein K is a constant, to store data representing $\Delta P_3$ in the data storage means, and to establish the time taken $T_3$ for the pressure as sensed by the pressure sensing means to drop by $\Delta P_3$, and to store data representing $T_3$ in the data storage means; and to input into the data processing means from the data storage means data representing $T_1$ or $T_2$ and $T_3$, the data processing means being programmed to calculate the rate of leakage of the system using the formula, $$\text{leak rate} = \frac{C \times [\text{calibrated leak rate}] \times T_3}{(T_1 \text{ or } T_2) - T_3}$$

where C is a constant; and to cause the calculated leak rate to be displayed on the data display means.

18. Apparatus as claimed in claim 17, in which $$K = \frac{P_o - (\Delta P_1 \text{ or } \Delta P_2)}{P_o}$$

and the apparatus data storage means stores data representing start pressure $P_o$, and from the data storage means data representing $P_o$ and $\Delta P_1$ or $\Delta P_2$ is input into the data processing means which is programmed to calculate K.

19. Apparatus as claimed in claim 17, in which $$K = \frac{P_I \text{ or } P_L}{P_o}$$

and the apparatus data storage means stores data representing start pressure $P_o$, pressure $P_I$ and pressure $P_L$, and from the data storage means data representing $P_o$, $P_I$ and $P_L$ is input into the data processing means which is programmed to calculate K.

* * * * *